United States Patent
Lau et al.

(10) Patent No.: US 11,108,720 B2
(45) Date of Patent: Aug. 31, 2021

(54) UPSELL FRAMEWORK FOR NETWORK SERVICES

(71) Applicant: T-Mobile USA, Inc., Bellevue, WA (US)

(72) Inventors: Kevin Lau, Issaquah, WA (US); Warren McNeel, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 33 days.

(21) Appl. No.: 16/438,260

(22) Filed: Jun. 11, 2019

(65) Prior Publication Data
US 2019/0297044 A1 Sep. 26, 2019

Related U.S. Application Data

(62) Division of application No. 14/341,721, filed on Jul. 25, 2014, now abandoned.

(60) Provisional application No. 62/018,504, filed on Jun. 27, 2014.

(51) Int. Cl.
| | |
|---|---|
| *H04L 12/58* | (2006.01) |
| *H04W 28/22* | (2009.01) |
| *H04L 12/825* | (2013.01) |
| *H04L 12/851* | (2013.01) |
| *H04W 8/18* | (2009.01) |
| *H04W 28/24* | (2009.01) |

(52) U.S. Cl.
CPC .............. *H04L 51/18* (2013.01); *H04L 47/26* (2013.01); *H04W 28/22* (2013.01); *H04L 47/24* (2013.01); *H04W 8/18* (2013.01); *H04W 28/24* (2013.01)

(58) Field of Classification Search
CPC ......... H04L 51/18; H04L 47/26; H04W 28/22
See application file for complete search history.

(56) References Cited

U.S. PATENT DOCUMENTS

| | | | |
|---|---|---|---|
| 8,767,544 B1 * | 7/2014 | Khanka | H04W 28/22 370/232 |
| 8,837,418 B2 | 9/2014 | Smith et al. | |
| 8,904,506 B1 * | 12/2014 | Canavor | G06F 16/00 726/7 |

(Continued)

FOREIGN PATENT DOCUMENTS

| | | |
|---|---|---|
| WO | 2011153170 A1 | 12/2011 |
| WO | 2013173308 A1 | 11/2013 |

OTHER PUBLICATIONS

China Patent Application No. 201580034726.X, First Office Action, dated Jul. 25, 2019, 8 pages.

(Continued)

*Primary Examiner* — Donald L Mills
(74) *Attorney, Agent, or Firm* — Han Santos, PLLC (57) ABSTRACT

Processes and systems described herein enable improvement of quality of experience (QoE) of network services using an upsell framework of the network services. Embodiments of the present disclosure include determining, by a computing device, a network throttling event associated with a network throttling imposed on an account of a user. In response to the determining, the computing device may at least cause presenting of one or more upgrade options in a user interface. After receiving a user selection of an upgrade option of the one or more upgrade options, the computing device may at least cause an adjustment of the network throttling.

20 Claims, 6 Drawing Sheets

(56) References Cited

U.S. PATENT DOCUMENTS

| | | |
|---|---|---|
| 9,325,597 B1 | 4/2016 | Clasen et al. |
| 2011/0047286 A1 | 2/2011 | Harrang et al. |
| 2011/0063977 A1 | 3/2011 | Halfmann et al. |
| 2011/0106946 A1 | 5/2011 | Bao et al. |
| 2012/0155296 A1 | 6/2012 | Kashanian |
| 2012/0327813 A1* | 12/2012 | Mohammed ............ H04J 3/14 370/259 |
| 2013/0065562 A1 | 3/2013 | Singh |
| 2013/0086252 A1 | 4/2013 | Cutler et al. |
| 2013/0132854 A1 | 5/2013 | Raleigh et al. |
| 2013/0203422 A1* | 8/2013 | Masputra ............ H04L 47/6215 455/445 |
| 2013/0215767 A1 | 8/2013 | Bryant et al. |
| 2013/0304616 A1 | 11/2013 | Raleigh et al. |
| 2014/0022897 A1 | 1/2014 | Rajagopalan et al. |
| 2014/0024340 A1* | 1/2014 | Raleigh ................ H04M 15/31 455/406 |
| 2014/0094159 A1* | 4/2014 | Raleigh ................ H04W 24/02 455/418 |
| 2015/0043429 A1 | 2/2015 | Kim et al. |
| 2015/0207708 A1* | 7/2015 | Raleigh ................ H04L 65/607 709/217 |
| 2015/0295808 A1* | 10/2015 | O'Malley ............ H04L 47/22 709/224 |
| 2016/0210578 A1 | 7/2016 | Raleigh et al. |
| 2016/0219092 A1 | 7/2016 | Tapia et al. |
| 2016/0344604 A1* | 11/2016 | Raleigh .................... G06F 9/54 |
| 2016/0373588 A1 | 12/2016 | Raleigh et al. |
| 2017/0078922 A1* | 3/2017 | Raleigh ................ H04W 28/10 |
| 2019/0311430 A1* | 10/2019 | Raleigh ............. H04M 15/8083 |
| 2020/0107226 A1* | 4/2020 | Raleigh ................ H04W 28/10 |

OTHER PUBLICATIONS

China Patent Application No. 201580034726.X, Second Office Action dated Feb. 28, 2020, 3 pages.

European Application No. 15812765.4, European Office Action dated Jan. 3, 2019, 6 pages.

European Application No. 15812765.4, Extended European Search Report dated Feb. 16, 2018, 6 pages.

U.S. Appl. No. 14/341,721, Non-Final Office Action dated Dec. 13, 2018, 17 pages.

International Patent Application PCT/US2015/033409, International Search Report dated Aug. 27, 2015, 11 pages.

U.S. Appl. No. 14/341,721, Final Office Action dated Jul. 13, 2018, 10 pages.

U.S. Appl. No. 14/341,721, Office Action dated Sep. 12, 2016, 9 pages.

U.S. Appl. No. 14/341,721, Office Action dated Dec. 26, 2017, 9 pages.

U.S. Appl. No. 14/341,721, Final Office Action dated Jun. 30, 2017, 9 pages.

* cited by examiner

UPSELL FRAMEWORK FOR NETWORK SERVICES

RELATED APPLICATIONS

This application claims priority to a commonly owned, co-pending U.S. patent application Ser. No. 14/341,721, filed on Jul. 25, 2014, titled "Upsell Framework for Network Services," which claims priority to a U.S. Provisional Patent Application No. 62/018,504, filed on Jun. 27, 2014, "titled "Upsell Framework for Network Services," which are herein incorporated by reference in their entirety.

BACKGROUND

Network throttling is a process of network management practice controlling network access and/or bandwidth usage based on certain rules. Generally, network throttling includes slowing and limiting of a data connection speed by a service provider (e.g., mobile network operators) to regulate network traffic and minimize network congestion. For example, a mobile network operator may limit a wireless connection speed for mobile users. The purpose of network throttling is to prevent individual users from consuming the excessive transmission capacity of the network, which is a shared resource. However, imposing network throttling may cause a bad quality of user experience (QoE) of services for affected users due to the reduced connection speed and/or corresponding cross layer protocol inefficiencies.

SUMMARY

Described herein are techniques and systems for enhancing quality of experience (QoE) of network services and applications using an upsell framework associated with network services. Embodiments of this disclosure enable communication of throttling information between a wireless network operator and a content service provider to facilitate upsell of wireless network services.

Various embodiments of the present disclosure include determining, by a computing device, a network throttling event associated with network throttling imposed on an account of a user for all or partial type of traffic. In response to determining the occurrence of network throttling, the computing device may at least cause presentation of one or more upgrade options in a user interface. After receiving a user selection of one of the one or more upgrade options, the computing device may at least cause an adjustment of the network throttling.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

A wireless network operator may impose throttling (e.g., reducing data traffic speeds) on a subscriber if a throttling limit (e.g., a data cap) of the subscriber has been reached. However, a third-party content service provider (e.g., Netflix®, YouTube®, etc.) does not necessarily know that the subscriber may reach its throttling limit or that the imposed throttling may cause a poor quality of user experience (QoE). Processes and systems described in the present disclosure establish an upsell framework that enables communication of throttling information between the wireless network operator and the content provider, and facilitate upselling of wireless network services. Since upsell notification is made proximate to the time of throttling, upsell is more likely, and it may be less likely that the user would blame the application, phone, or carrier for poor QoE caused by the throttling.

Illustrative Environment

Figure 1:
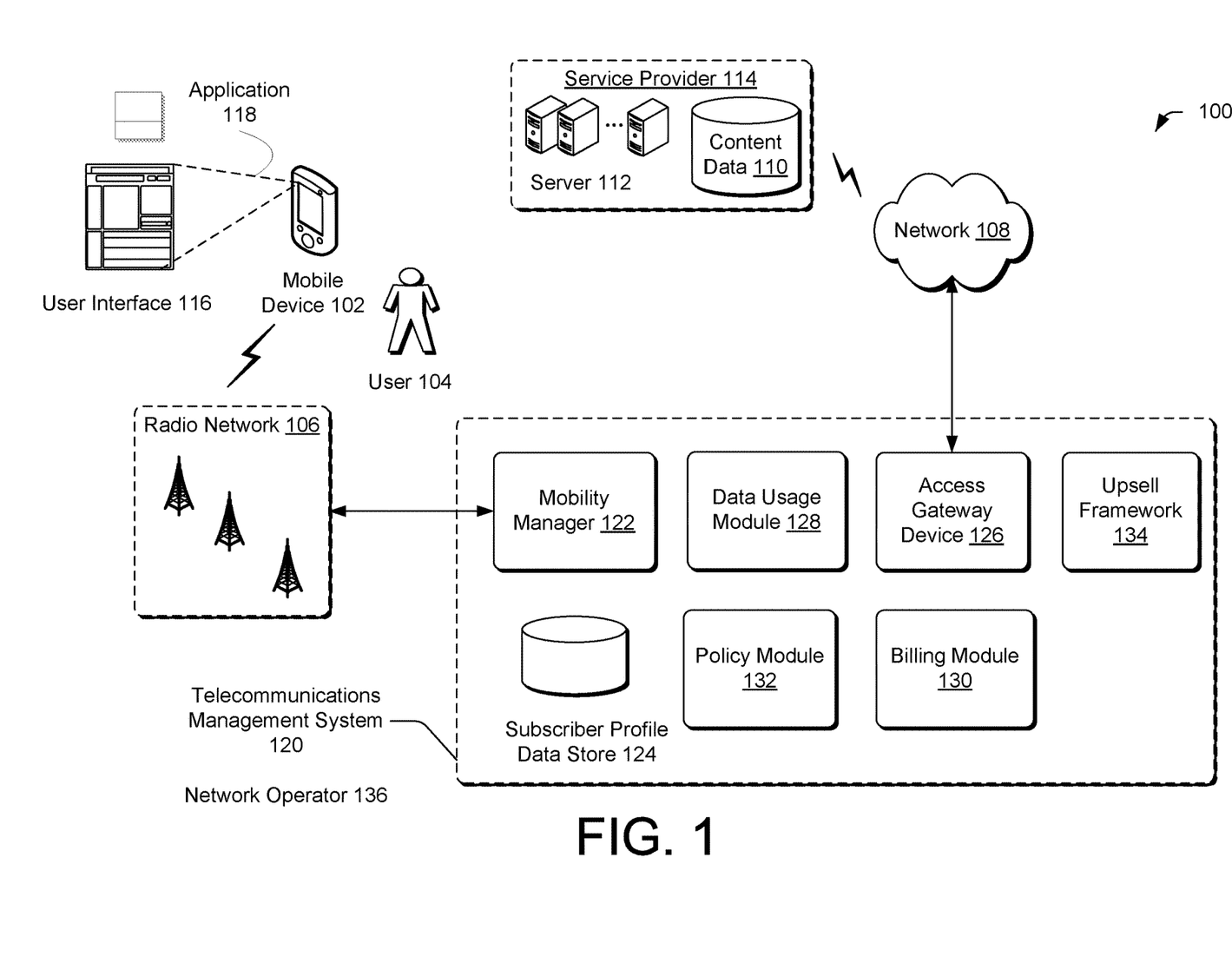
FIG. 1 is a diagram of an illustrative telecommunication environment that enables upsell of network services.

FIG. 1 is a diagram of an illustrative telecommunication environment 100 that enables upselling of network services. The environment 100 includes a mobile device 102 associated with a user 104. The articles "a" and "an" are used herein to refer to one or to more than one (i.e. to at least one) of the grammatical object of the article. By way of example, "a user" means one user or more than one users. The user 104 may include a user who uses a computing device (e.g., the mobile device 102) to exchange information via a network system. In some embodiments, the user 104 may include a subscriber who subscribes to a service (e.g., network services, content services, etc.) provided by a service provider.

The mobile device 102 may correspond to a wide variety of telecommunications devices or components that are capable of initiating, receiving or facilitating communications over a radio network 106. The mobile device 102 may include one or more of personal computing devices, electronic book readers (e.g., e-book readers), hand held computing devices, integrated components for inclusion in computing devices, home electronics, appliances, vehicles, machinery, landline telephones, network-based telephones (e.g., voice over IP ("VoIP"), cordless telephones, cellular telephones, smart phones, modems, personal digital assistants, laptop computers, gaming devices, media devices, etc.

The mobile device 102 may include a component for communicating with one or more other devices via one or more communication channels including, for example, wireless communication channels (e.g., infra-red, RF, optical, terrestrial, satellite communication media, etc.) and wired communication channels (e.g., copper wires, coaxial cables, Fiber-optic cables, etc.). For example, the mobile device 102 may establish communications over a network 108, which may include any one or a combination of multiple different types of wireless and/or wired communication channels.

Via the network 108, the mobile device 102 may access content data 110 (e.g., electronic media) maintained by a server 112 associated with a service provider 114. The service provider 114 may provide media services including, for example, access to the content data 110 (e.g., music and video), access to the Internet, and/or access to other services (e.g., value-added services). The content data 110 may include an electronic medium including, for example, video recordings, audio recordings, multimedia presentations, slide presentations, CD-ROM, online content, etc. The content data 110 may be in either analog electronic data or digital electronic data format.

In some embodiments, the content data 110 may be presented in a user interface 116 by execution of an application 118 installed on the mobile device 102. The application 118 may include a computer program designed to run on smartphones, tablet computers and other mobile devices. The application 118 may be obtained from an app stores or pre-installed on the mobile device 102 by a partner associated with a wireless network operator.

The mobile device 102 may also communicate with a telecommunications management system 120, which includes a set of functionalities of hardware (e.g., computing devices) and/or software (e.g., programs) that pertain to the operation, administration, maintenance, and/or provisioning of a telecommunications network (e.g., the radio network 106 and/or the network 108).

The telecommunications network may include a collection of electronic system of links and switches, and the controls that govern their operation, that allows for data transfer and exchange among multiple users. For example, the telecommunications network may include terminals, telecommunications channels terminal nodes, links and/or any intermediate nodes which are connected so as to enable telecommunication between the terminals. Terminals may include an input and/or output device (e.g., a mobile device) that is used to transmit or receive data. Telecommunications channels may include channels by which data is transmitted and received. For example, telecommunication channels may be created through a variety of media including, for example, copper wires, coaxial cables, Fiber-optic cables, and wireless radio frequencies. Nodes may be equipped with three or more channels that switch information received along these links to direct the information towards terminal nodes.

The telecommunications network may include a wireless network uses wireless data connections for connecting at least a portion of nodes of the wireless telecommunications network. Examples of wireless networks may include cellular networks, Wi-Fi local networks, Bluetooth® network, and terrestrial microwave networks.

The telecommunications management system 120 may include a server or a collection of servers in a distributed configuration (e.g., cloud computing service, server farm, etc.) or non-distributed configuration. The telecommunication management system 120 may include various components (e.g., modules) such as a mobility manager 122, a subscriber profile data store 124, an access gateway device 126, a policy module 132, a billing module 130, and/or an upsell framework 134.

The telecommunications management system 120 may be operated by a network operator 136 to provide services including an Internet access service associated with the network 108. The Internet access service may connect individual computer terminals, computers, mobile devices, and/or computer networks to the network 108, for example, to allow users (e.g., user 104 via mobile device 102) to access Internet services, such as email, electronic media, the World Wide Web, etc. The Internet access service may be charged in various ways (e.g., rental charges, usage charges, etc.). Rental charges of the Internet access service refer to charges taken from the user 104 on a periodic (e.g., monthly) basis against a service (e.g., the Internet access) provided. Usage charges of the Internet access service refer to charges taken from the user 104 based on the service utilization (e.g., data downloaded using the mobile device 102).

The mobility manager 122 may obtain requests for connectivity to the network 108 from the mobile device 102 via the radio network 106. The mobility manager 122 may include one or more structures or components implementing an air interface protocol and/or standard. For example, the mobility manager 122 may perform one or more functionalities of a Mobility Management Entity ("MME") key control node as specified for the Long Term Evolution ("LTE") air interface protocol. For example, the mobility manager 122 may perform one or more functionalities of a Serving GPRS Support Node ("SGSN") node in accordance with the General Packet Radio Service ("GPRS") and Universal Mobile Telecommunications System ("UMTS") air interface protocols.

The mobility manager 122 may also maintain security data that facilitates the authentication and authorization of the mobile device 102. For example, the mobility manager 122 may maintain the subscriber profile data store 124 for storing the security data associated with the mobile device 102 and/or an account of the user 104. The subscriber profile data store 124 may correspond to a single data store or a set of data stores maintained either locally or in a distributed manner. For example, upon receipt of a communication request from the mobile device 102, the mobility manager 122 may process the communication request based on security information or authentication information stored on the subscriber profile data store 124. The mobility manager 122 may also maintain data, for example, in the form of data tables that facilitate provisioning of the access gateway device 126 for the mobile device 102.

The access gateway device 126 may provide and/or facilitate a data connection between the mobile device 102 and the network 108. The access gateway device 126 may include one or more structures or components implementing an air interface protocol and/or standard. For example, the access gateway device 126 may perform one or more functionalities of Gateway GPRS Support Node ("GGSN") in accordance with the GPRS and UMTS air interface standards. For example, the access gateway device 126 may perform one or more functionalities of the Packet Data Gateway ("PDN") for the LTE air interface standards.

In some embodiments, the access gateway device 126 may generate data usage records including information of the data usage between the mobile device 102 and the radio network 106. For example, data usage records may include Data Call Detail Records ("CDR"), Data Usage Records ("DUR"), etc. The data usage records may be transmitted by the access gateway device 126 to the data usage module 128 via a push or pull model.

The data usage module 128 may include various components or combination of components implemented by one or more computing devices. Also, the functionality associated with the data usage module 128 may be distributed across a communication network, such as a local area network or wide area network associated with the telecommunications management system 120. In some embodiments, the data usage module 128 may include various components/subcomponents that may be utilized in conjunction with the processing of data usage information corresponding to mobile device 102. For example, the data usage module 128 may collect and process data usage records generated by the access gateway device 126.

In some embodiments, the data usage module 128 may group processed data usage records over a defined period of time (e.g., a billing cycle). In these instances, the data usage module 128 may keep track of additions/subtractions to data usage quotas. The data usage module 128 may also include various interfaces for communicating with the access gateway device 126, the mobile device 102, and/or other components of the telecommunication environment 100.

In some embodiments, the data usage module 128 may process multiple data usage records to obtain additional information, to remove information or to modify the measured usage. For example, the data usage module 128 may filter out any data usage records relating to data in which the user 104 would not be charged or considered against the plan (e.g., whitelist resources). The data usage module 128 may then continue to collect the data records on a per-session basis before further processing.

In some embodiments, the data usage module 128 may process an individual data usage record of multiple data usage records and then aggregate multiple data usage records representative of the cumulative data usage for the user 104 over a predetermined period of time. The data usage module 128 may then process the aggregated data usage records against one or more thresholds or one or more data usage quotas that are maintained by the data usage module 128. In these instances, the thresholds or quotas may correspond to a service plan/subscription plan associated with the user 104 in which one or more data limits have been defined.

In some embodiments, the threshold may include a bandwidth cap (e.g., 256 kilobyte/second (Kbps)) that limits the bitrate or data connection speed on, for example, a connection to the network 108. The data connection speed may include a data signaling rate (DSR) indicating an aggregate rate at which data pass a point in the transmission path of the network 108. For example, the data connection speed may be represented in bits per second, for example, one gigabit or one billion bits per second (i.e., 1 Gbit/s).

In some embodiments, the data usage quota may include a restriction that limits the volume of data downloaded and/or uploaded by the mobile device 102 during a predetermined time period (e.g., a day, a week, a month). Once the volume (e.g., 250 gigabytes/month) has been reached by the user 104, the speed at which the mobile device 102 accesses the network 108 may be throttled to a slower speed or zero.

In some embodiments, in response to a determination that a data usage threshold has been exceeded by a given user or mobile device, the data usage module 128 may generate notifications or initiate additional action(s). In these instances, the data usage module 128 may transmit one or more notifications to the mobile device 102, e.g., via radio network 106, to inform the user 104 of the fact that the threshold has been exceeded. For example, the data usage module 128 may generate an SMS message or e-mail message that is transmitted to the mobile device 102, e.g., via the radio network 106.

The telecommunication environment 100 may also include the billing module 130 in communication with the data usage module 128. The billing module 130 may be implemented by one or more computing devices and may include multiple software functionalities including, for example, providing an interface to facilitate the management of subscriber accounts in the event that the user 104 has exceeded a data usage threshold or data usage quota.

The telecommunication environment 100 may include the policy module 132 that may be implemented by one or more computing devices and may include multiple software functionalities including, for example, maintaining and/or managing various data or network, policies. In some embodiments, the policy module 132 may modify policies associated with an account of the user 104 based at least on data usage of the mobile device 102. The policy module 132 may maintain information regarding a current network data policy associated with the account of the user 104 in the subscriber profile data store 124. The policies may include, for example, a service level indicating a level of service that the network operator 136 sells to the user 104 as a subscriber. For example, the service level may be included in a service level agreement between the network operator 136 and the user 104. For example, the network operator 136 may provide different guaranteed levels of service such as various data rates (e.g., throughput rates) based on pricing plans and amounts of data transmitted via the network 108.

In some embodiments, the data usage module 128 may transmit a notification to the billing module 130. In these instances, the billing module 130 may modify a billing to a subscriber data plan or interface with the user 104 relative to the exceeded threshold. In some embodiments, the data usage module 128 may transmit a notification to the user 104, or otherwise initiate or cause the policy module 132 to modify the data access policy associated with the user 104. For example, the policy module 132 may update a configuration in the access gateway device 126 to limit the data transfer bandwidth made available to the mobile device 102, thereby imposing network throttling on the account of the user 104.

In some embodiments, network throttling may be imposed on the account of the user 104 at a low pricing level. In these instances, the user 104 may be provided opportunities for the network operator 136 to upsell data plans, which may require the user 104 or the service provider 114 to pay more for faster speeds with respect to the data connection between the mobile device 102 and the service provider 114 via the network 108. In some embodiments, the network operator may impose network throttling after the user 104 consumes a certain amount of data in a given billing period. In these instances, a first amount of data may be transferred at a full speed, but a second amount of the data transferred after a network throttling limit is reached may be throttled to a slower speed until the end of the billing period. In some embodiments, the network operator may impose the network throttling on the account of the user 104 when the user 104 consumes "excessive" or unusually large amounts of data in a specific time period.

In some embodiments, the data usage module 128 may provide information of data usage associated with the user 104 to the upsell framework 134. The upsell framework 134 may communicate with one or more components of the telecommunications management system 120 to enhance the QoE of services associated with the network operator 136 and/or the service provider 114. For example, the upsell framework 134 may receive information of an updated policy of the user 104, and/or communicate with the policy module 132 to update a configuration in the access gateway device 126 to remove the limitation of the data transfer bandwidth imposed on the account of the user 104. In some embodiments, the upsell framework 134 may facilitate presenting of one or more upgrade options on the mobile device 102, and also adjust the network throttling imposed on the account of the user 104 in response to a user selection (e.g., by user 104) of one of the one or more upgrade options.

Illustrative Process

Figure 2:
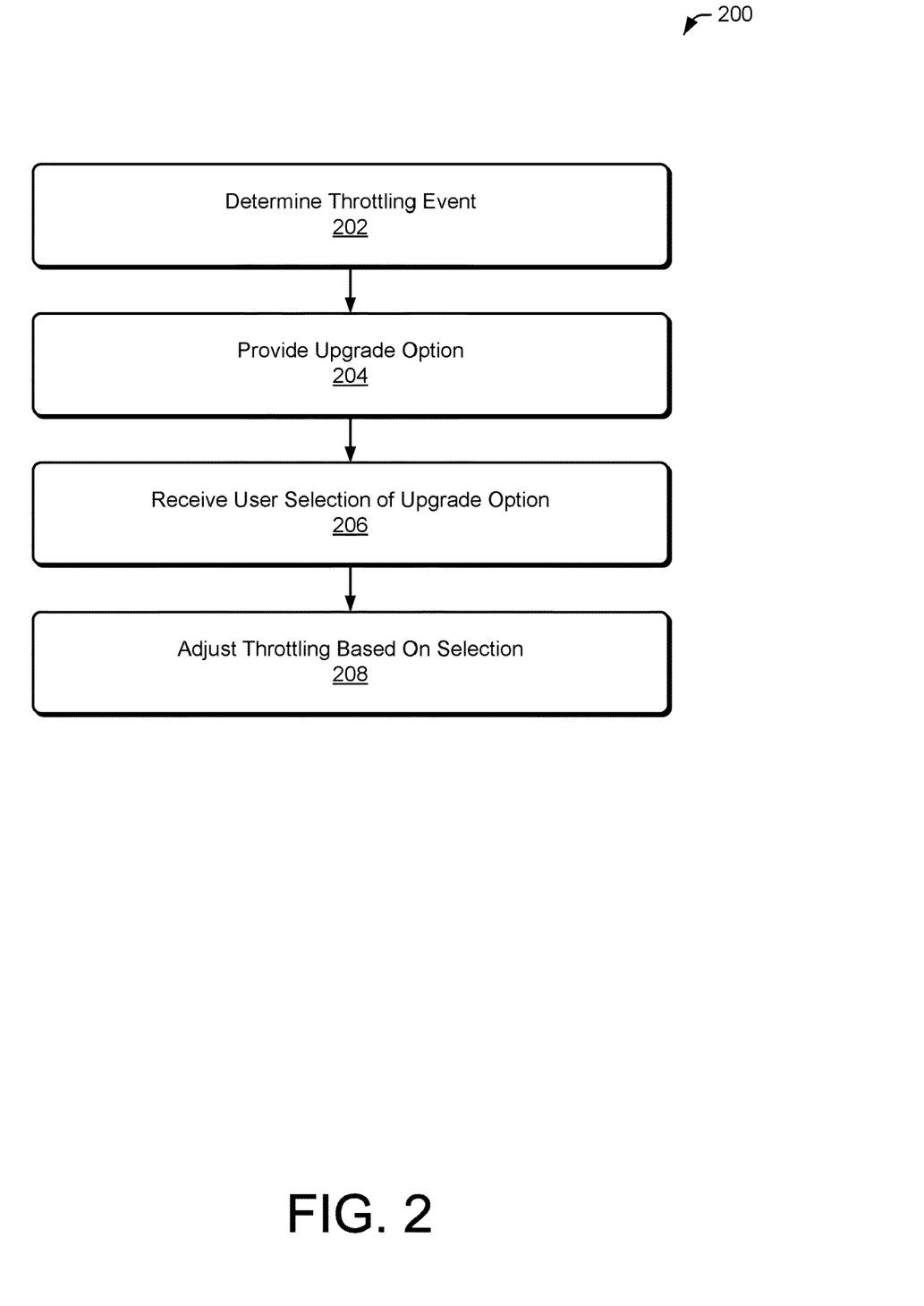
FIG. 2 is a flow diagram of an illustrative process for upsell of network services.

FIG. 2 is a flow diagram of an illustrative process 200 for upselling of network services. The process 200 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes (e.g., processes 500 and 600) described throughout this disclosure, in addition to process 200, shall be interpreted accordingly. The process 200 is described with reference to the telecommunication environment 100. However, the process 200 may be implemented in other environments, and/or computing architecture.

At 202, the mobile device 102 or the server 112 may determine an occurrence of a network throttling event. A network throttling event may include an occurrence of network throttling on the account of the user 104 with respect to a data connection between the mobile device 102 and the network 108. In some embodiments, the mobile device 102 or the server 112 may detect reduced network performance of a communication between the network 108 and the mobile device 102, and then determine that the reduced network performance is caused by the network throttling imposed by the network operator 136 on the account of the user 104.

In some embodiments, the network performance of the network 108 may be characterized by one or more network parameters such as, for example, data connection speed, latency, jitter, etc. In these instances, the reduced network performance may be detected based on values of one or more of the above-listed network parameters.

In some embodiments, the network throttling may be implemented by various methods (e.g., traffic shaping and traffic policing) at different locations on a wireless network. In these instances, the network 108 or the mobile device 102 may determine that the reduced network performance is due to network throttling by determining that either or both of traffic shaping and traffic policing has/have been imposed on the account of the user 104 with respect to the data connection between the mobile device 102 and the network 108.

In some embodiments, the network operator 136 may perform traffic shaping at an access network level of the network 108. For example, the traffic shaping may delay metered traffic associated with one or more end users (e.g., user 104) to bring the metered traffic into compliance with a desired traffic policy (e.g., a traffic contract).

In some embodiments, the network operator 136 may perform traffic policing at the telecommunications management system 120. For example, the traffic policing may monitor wireless data transmissions and enforce a desired traffic policy using, for example, a token bucket algorithm. The telecommunications management system 120 may discard non-conformant data or queue the data for subsequent transmissions when sufficient tokens have accumulated. In these instances, the service provider 114 may not be aware of the discarded data, and therefore may re-send the discarded data to the mobile device 102 via the network 108. This may increase the traffic on the network 108 for multiple users.

In some embodiments, the mobile device 102 or the server 112 may transmit a request for network throttling information associated with the user 104 to the telecommunications management system 120 in response to a detection of the reduced performance. In response to the request, the telecommunications management system 120 may provide the network throttling information to the mobile device 102 or the server 112, which may determine the occurrence of a network throttling event based on the network throttling information.

At 204, the mobile device 102 may present one or more upgrade options associated with a usage of the network 108 to the user 104 in response to the determination of the occurrence of the network throttling event. For example, the upgrade option may include either or both of a rental charge or a usage charge that are associated with a data connection between the mobile device 102 and the network 108 in a predetermined time period. In some embodiments, the application 118 may present the content data 110 to the user 104 in the user interface 116 at the mobile device 102, and present or display the upgrade option in the user interface 116 while presenting the content data 110. In these instances, since a notification of the upgrade option is made proximate to the time of throttling, the user 104 may be more willing to accept the upgrade option.

At 206, the mobile device 102 may receive a user selection made by the user 104 in response to seeing the upgrade option on the mobile device 102. In some embodiments, the upgrade option, as presented in the user interface 116 at the mobile device 102, may include a link leading to the user interface 116 associated with the rental charge and/or the usage charge provided by the service provider 114 or the network operator 136. For example, the upgrade option may redirect the user 104 to a browser webpage associated with upselling of network services. In some embodiments, the upgrade option may include either or both of a rental charge and a usage charge that are associated with the data connection between the mobile device 102 and the network 108 in a predetermined time period.

At 208, the telecommunications management system 120 may adjust the network throttling imposed on the account of the user 104 based on the information associated with the selection of the user 104. For example, the policy module 132 may update a configuration in the access gateway device 126 to modify (e.g., increase) a data transfer bandwidth associated with the mobile device 102 to allow transmission of data to mobile device 102 at a different (e.g., higher) rate than the current rate. Since the data transfer bandwidth is increased and the service provider 114 does not need to re-send data, the traffic on the network 108 caused by the traffic policing with respect to the account associated with user 104 may be reduced or avoided.

Illustrative Architecture

Figure 3:
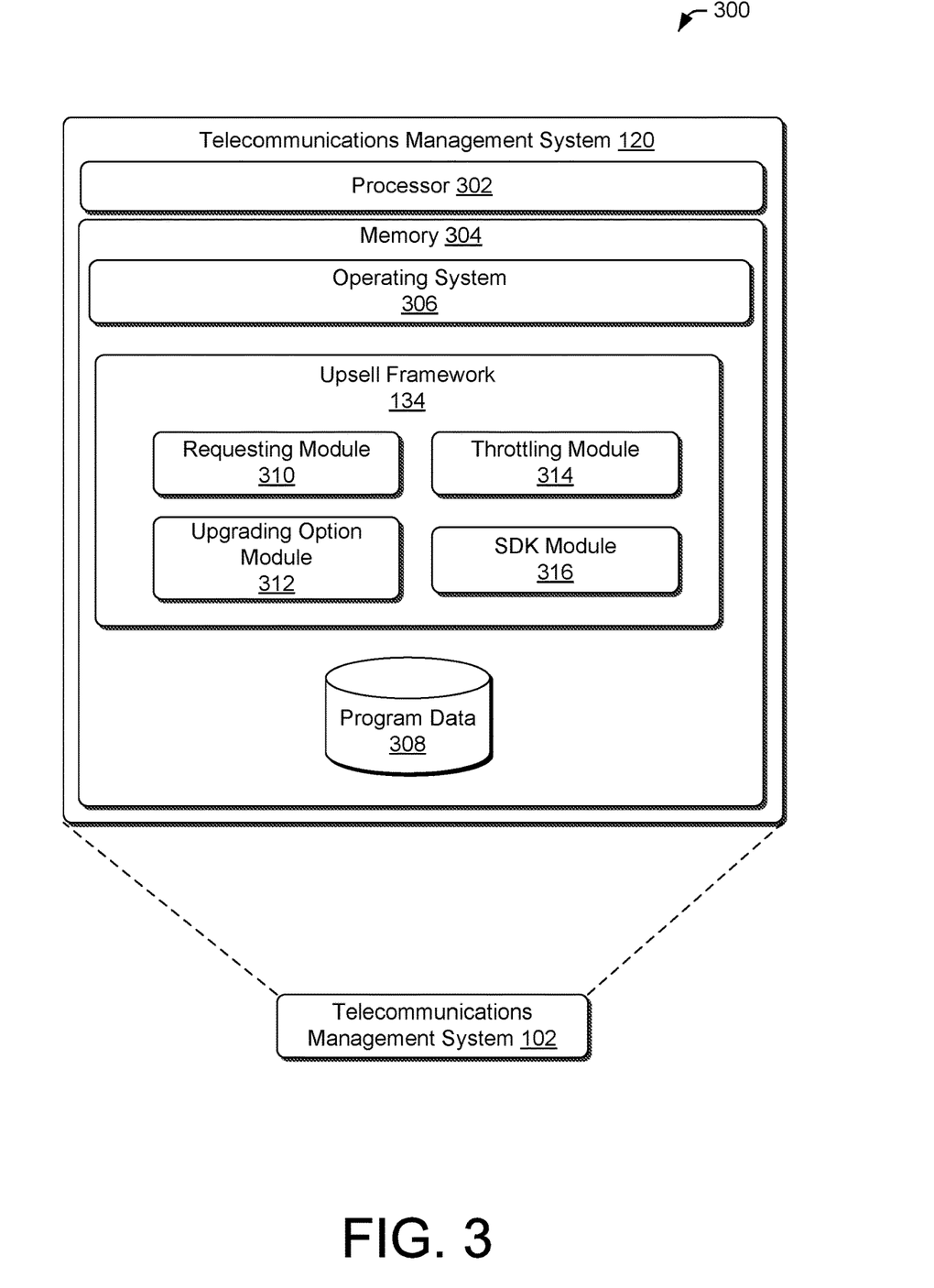
FIG. 3 is a schematic diagram of an illustrative computing architecture to enhance QoE of services using an upsell framework associated with the network services.

FIG. 3 is a schematic diagram of an illustrative computing architecture 300 configured to enhance QoE of services using an upsell framework of the network services. The computing architecture 300 shows additional details of at least one portion of the telecommunication management system 120, which may include additional modules, kernels, data, and/or hardware.

The computing architecture 300 may include a processor 302 and memory 304. The memory 304 may store various modules, applications, programs, or other data. The memory 304 may include instructions that, when executed by the processor 302, cause the processor 302 to perform the operations described herein for the telecommunication management system 120. The processor 302 may include one or more graphics processing units (GPU) and one or more central processing units (CPU).

The telecommunication management system 120 may have additional features and/or functionality. For example, the telecommunication management system 120 may also include additional data storage devices (removable and/or non-removable). Computer-readable media may include, at least, two types of computer-readable media, namely computer storage media and communication media. Computer storage media may include volatile and non-volatile, removable, and non-removable media implemented in any method or technology for storage of information, such as computer readable instructions, data structures, program modules, program data, or other data. The system memory, the removable storage and the non-removable storage are all examples of computer storage media. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other medium that can be used to store the desired information and which can be accessed by the telecommunication management system 120. Any such computer storage media may be part of the telecommunication management system 120. Moreover, the computer-readable media may include computer-executable instructions that, when executed by the processor(s), perform various functions and/or operations described herein.

In contrast, communication media may embody computer-readable instructions, data structures, program modules, or other data in a modulated data signal, such as a carrier wave, or other mechanism. As defined herein, computer storage media does not include communication media.

The memory 304 may store an operating system 306 as well as the upsell framework 134, and program data 308. The upsell framework 134 may include various components (e.g., modules) such as a requesting module 310, an upgrade option module 312, a throttling module 314, and an SDK module 316.

The request module 310 may receive a request for network throttling information associated with the user 104. The network throttling information may indicate that network throttling is imposed on an account of the user 104. The request module 310 may provide the network throttling information in response to the request. For example, the server 112 or the application 118 may detect a reduced performance with respect to a communication between the network 108 and the mobile device 102. The server 112 or the application 118 may transmit a request for network throttling information associated with the user 104 to the telecommunications management system 120 to determine whether the reduced performance is associated with the network throttling imposed on an account of the user 104 and/or performance of the application 118.

The upgrade option module 312 may enable presenting of one or more upgrade options associated with the usage of the network 108 by user 104, and the one or more upgrade options may be presented in the user interface 116 at the mobile device 102. The upgrade option module 312 may receive information associated with a user selection of the one or more upgrade options (e.g., the selection made by user 104). In some embodiments, the one or more upgrade options may include either or both of a rental charge and a usage charge that are associated with a data connection between the mobile device 102 and the network 108 in a predetermined time period. In some embodiments, the one or more upgrade options may include an option of purchasing an Internet access service by the service provider 114 to allow one or more mobile devices associated with the account of the user 104 to have an access to the content data 110.

In some embodiments, the upgrade option module 312 may cause a presenting of the content data 110 to the user 104 by execution of the application 118 at the mobile device 102. The upgrade option module 312 may also cause a message to be surfaced along with the presenting of the content data 110 at the mobile device 102, and the message is associated with the one or more upgrade options. For example, the mobile device 102 may communicate with the server 112 via the network 108 to present the content data 110 to the user 104. The content data 110 may be displayed in the user interface 116 by execution of the application 118 at the mobile device 102. In response to a determination that network throttling is imposed on the account of the user 104 and/or there is a reduced performance with respect to a communication between the network 118 and the mobile device 102, the application 118 may surface a message or notification including the one or more upgrade options. Since the surfacing or presentation of the message is made proximate to the time of throttling, the user 104 may be more willing to accept the one or more upgrade options. In addition, the user 104 may not blame the application 118, the mobile device 102, the service provider 114, or the telecommunications management system 120 for poor QoE.

The throttling module 314 may adjust the network throttling on the account of the user 104 based on the information associated with the user selection of the user 104. In some embodiments, the throttling module 314 may communicate with one or more components of the telecommunications management system 120 to adjust the network throttling on the account of the user 104 in response to a determination that the user 104 selects one of the one or more upgrade options to, for example, upgrade a service level of a service provided by a network operator to the user 104. For example, the throttling module 314 may communicate with the policy module 132 to update a configuration in the access gateway device 126 to modify a data transfer bandwidth associated with the mobile device 102. In some embodiments, the throttling module 314 may also determine that the usage of the network 108 by user 104 is greater than a predetermined threshold, and then impose the network throttling on the account of the user 104. For example, the throttling module 314 may communicate with one or more components of the telecommunications management system 120 to impose the network throttling on the account of the user 104.

The SDK module 316 may provide a software development kit (SDK). For example, the SDK module 316 may provide a SDK for the creation of the application 118 that may be executed at the mobile device 102 to perform a functionality such as, for example, surfacing a content and/or a message including the one or more upgrade options in the user interface 116 at the mobile device 102. The SDK may include multiple application programming interfaces (APIs) of multiple services associated with the network 108.

Figure 4:
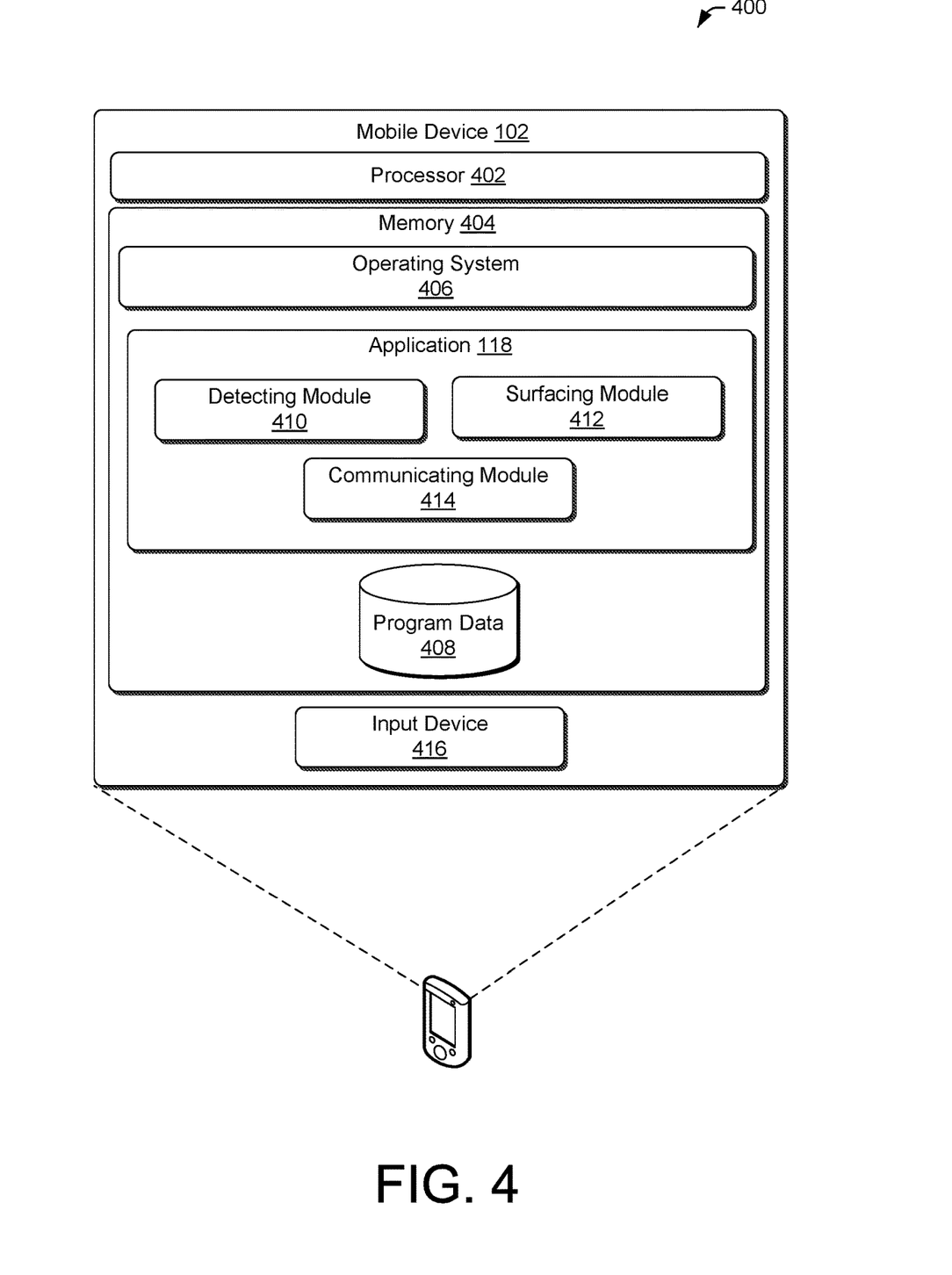
FIG. 4 is another schematic diagram of an illustrative computing architecture to enhance QoE of services using an upsell framework associated with the network services.

FIG. 4 is another schematic diagram of an illustrative computing architecture 400 configured to enhance QoE of services using an upsell framework of the network services. The computing architecture 400 shows additional details of at least one portion of the mobile device 102, which may include additional modules, kernels, data, and/or hardware.

The computing architecture 400 may include a processor 402 and memory 404. The memory 404 may store various modules, applications, programs, or other data. The memory 404 may include instructions that, when executed by the processor 402, cause the processor 402 to perform the operations described herein for the mobile device 102. The processor 402 may include one or more graphics processing units (GPU) and one or more central processing units (CPU).

The memory 404 may store an operating system 406 as well as the application 118, and program data 408. The application 118 may include various components (e.g., modules) such as a detecting module 410, a surfacing module 412, and the communication module 414.

The detecting module 410 may detect a reduced performance with respect to a communication between the network 108 and the mobile device 102. For example, the detecting module 410 may measure the performance of the network 108 based on one or more network parameters such as, for example, data connection speed, latency, jitter, and etc. The detecting module 410 may further determine that the reduced performance is associated with network throttling imposed on an account of the user 104. For example, the detecting module 410 may determine the reduced performance is associated with the network throttling based on the information of the network throttling provided by the network operator 136.

The surfacing module 412 may provide in the user interface 116 at the mobile device 102 one or more upgrade options to the user 104, and the one or more upgrade options may be associated with the usage of the network 108 by user 104. In some embodiments, the surfacing module 412 may present in the user interface 116 the content data 110 to the user 104 by executing the application 118 at the mobile device 102. In response to a determination that network throttling is imposed on the account of the user 104 and/or a reduced performance with respect to a communication between the network 118 and the mobile device 102, the surfacing module 412 may surface a message in the user interface 116 at the mobile device 102, and the message may include the one or more upgrade options. In some embodiments, the one or more upgrade options may include an option to upgrade a service level of a service provided by the network operator 136 to the user 104. In some embodiments, the one or more upgrade options may include an option of purchase of an Internet access service by the service provider 114 to allow one or more mobile devices associated with the account of the user 104 to have access to the content data 110.

The surfacing module 412 may also receive a user selection of the one or more upgrade options and transmit the user selection to the server 112 and/or the telecommunications management system 120. In some embodiments, the application 118 may enable the user 104 to disable a function associated with surfacing of the message indicating the one or more upgrade options, such that the message may not be presented next time.

The communication module 414 may at least partially cause an adjustment of the network throttling imposed on the account of the user 104 based on the selection made by user 104. In some embodiments, the communication module 414 may at least partially cause a request for information of the network throttling associated with the user 104, and at least partially cause a receipt of the information of the network throttling associated with the user 104. For example, the communication module 414 may communicate with the telecommunications management system 120 to adjust the network thrilling imposed on the account of the user 104.

The mobile device 102 may also have input device(s) 416 such as keyboard, mouse, pen, voice input device, touch input device (e.g., stylus, pen, etc.), touch screen device, navigation devices (e.g., track pad, mouse, etc.) etc. In some embodiments, input methods may be implemented via Natural User Interface (NUI). NUI may include any interface technology that enables a user to interact with a device in a "natural" manner, free from artificial constraints imposed by input devices such as mice, keyboards, remote controls, and the like. Examples of NUI methods may include those relying on speech recognition, touch and stylus recognition, gesture recognition both on screen and adjacent to the screen, air gestures, head and eye tracking, voice and speech, vision, touch, gestures, and machine intelligence. Categories of NUI technologies may include touch sensitive displays, voice and speech recognition, intention and goal understanding, motion gesture detection using depth cameras (such as stereoscopic camera systems, infrared camera systems, RGB camera systems and combinations of these), motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (Electroencephalography (EEG) and related methods).

Illustrative Processes

Figure 5:
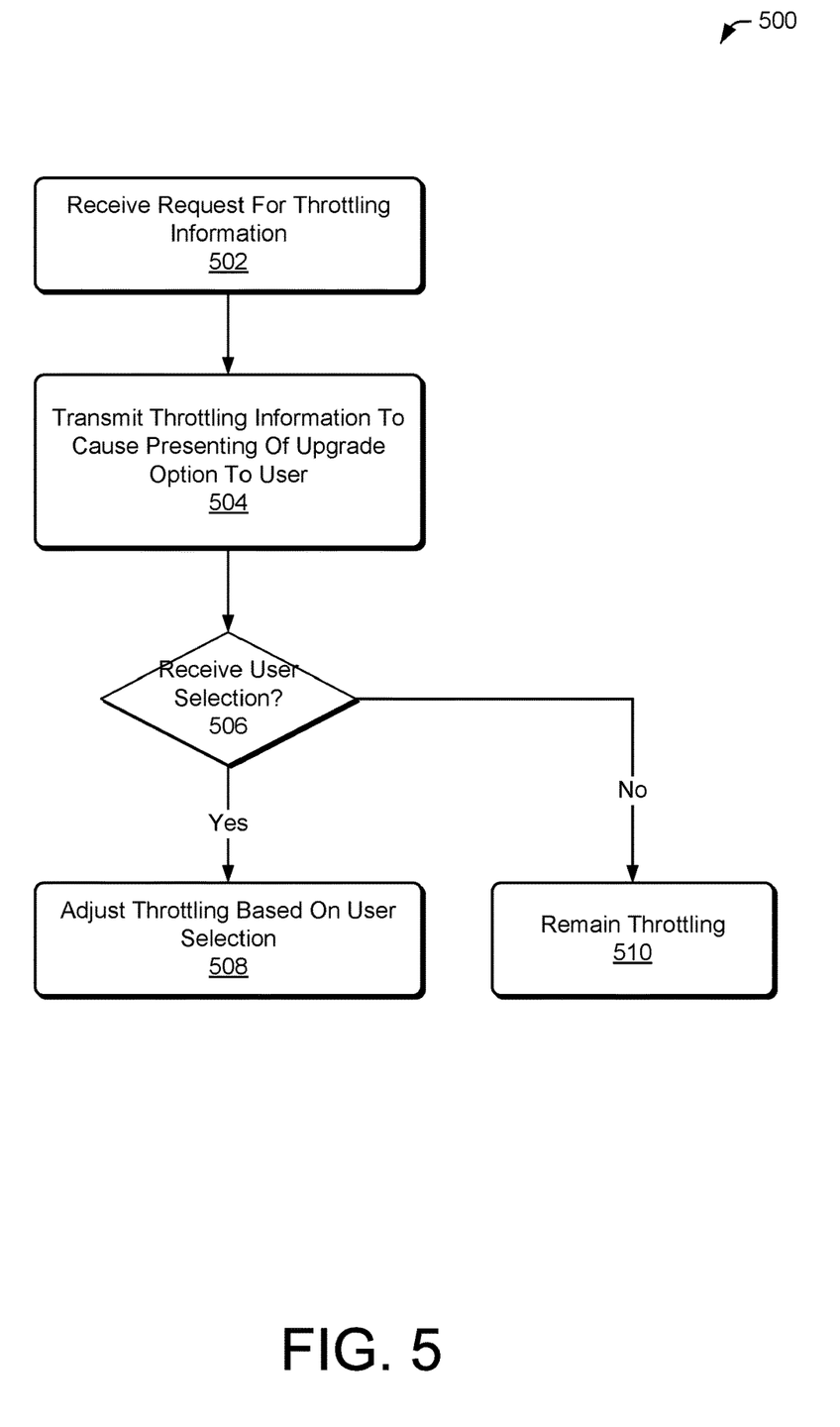
FIG. 5 is a flow diagram of an illustrative process for enhancing QoE of services using an upsell framework associated with the network services.
Figure 6:
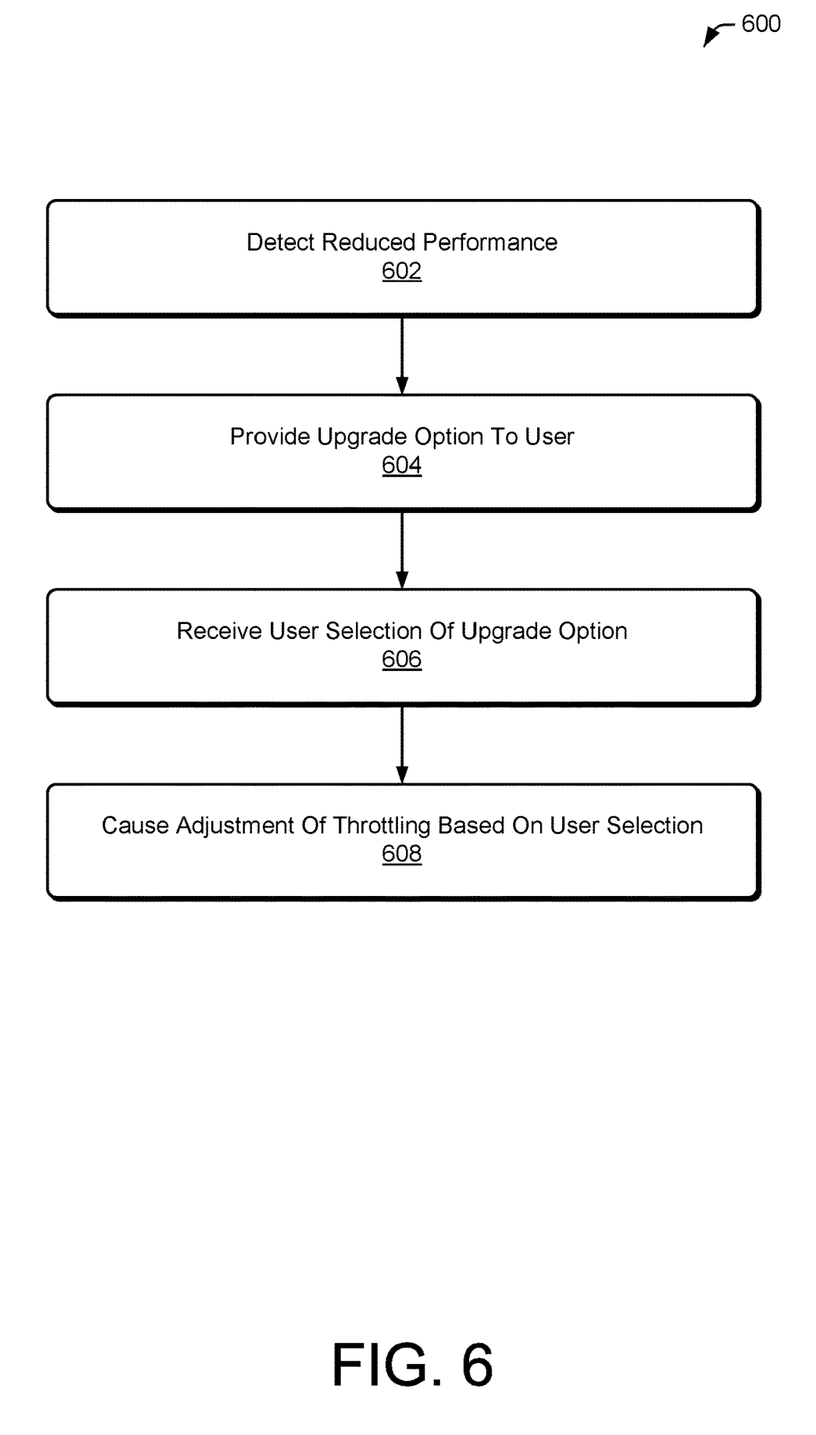
FIG. 6 is another flow diagram of an illustrative process for enhancing QoE of services using an upsell framework associated with the network services.

FIGS. 5 and 6 include processes that are described with reference to the telecommunication environment 100 and computing architectures 300 and/or 400. However, the processes may be implemented using other schemes, environments, and/or computing architecture. Each of the processes 500 and 600 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 5 is a flow diagram of an illustrative process 500 for enhancing QoE of services using an upsell framework of the network services. At 502, the requesting module 310 may receive a request for network throttling information associated with the user 104. The network throttling information may indicate network throttling imposed on an account of the user 104. For example, the network throttling causes a reduction of a data connection speed of a communication between the mobile device 102 and the network 108. In some embodiments, the data usage module 128 may determine that the usage of the network 108 associated with the account of the user 104 is greater than a predetermined value. The data usage module 128 may communicate with the access gateway device 126 to impose the network throttling on the account of the user 104.

At 504, in response to receiving the request, the upgrade option module 312 may provide the network throttling information to enable presenting of one or more upgrade options associated with the usage of the network 108 by user 104 in the user interface 116 at the mobile device 102. In some embodiments, the telecommunications management system 120 may cause presenting of the content data 110 in the user interface 116 by execution of an application at the mobile device 102. The upgrade option module 312 may cause surfacing of at the mobile device 102 along with the presenting of the content data 110 in response to a determination of the network throttling imposed on the account of the user 104. The message may indicate the one or more upgrade options in the user interface 116.

In some embodiments, the one or more upgrade options may include an option of upgrade a data service level associated with the account of the user 104 within a predetermine time period. In some embodiments, the one or more upgrade options may include an option of purchase of an Internet access service allowing one or more mobile devices associated with the account of the user 104 to have an Internet access without the network throttling or with a reduced network throttling. For example, the Internet access may be restricted to access a certain portion of the content data 110.

The Internet access service may be purchased by the user 104 or by the service provider 114. In some embodiments, the service provider 114 may purchase the Internet access service and provide the Internet access service to the user 104 without charge or based on a predetermined condition. For example, the predetermined condition may include a service agreement between the service provider 114 and the user 104 with respect to a content service.

At 506, the throttling module 314 may determine whether information associated with a user selection of the one or more upgrade options is received. For example, the information may indicate that the user 104 chooses, from among the one or more upgrade options, a rental charge or a usage charge of the Internet access service associated with the network 108.

At 508, if the information associated with the user selection is received (i.e., the "Yes" branch of operation 506), the throttling module 314 may communicate with one or more components of the telecommunications management system 120 to adjust the network throttling imposed on the account of the user 104. For example, the policy module 132 may update a configuration in the access gateway device 126 to modify a data transfer bandwidth associated with the mobile device 102. If the information is not received (i.e., the "No" branch of operation 506), the throttling module 314 may communicate with one or more components of the telecommunications management system 120 to maintain the network throttling on the account of the user 104.

In some embodiments, the SDK module may provide a SDK for the creation of the application 118 that is executed at the mobile device 102 to present the one or more upgrade options in the user interface 116 at the mobile device 102. For example, the SDK may include a plurality of APIs of a plurality of services associated with network services.

FIG. 6 is another flow diagram of an illustrative process 600 for enhancing QoE of services using an upsell framework of the network services. At 602, the detecting module 410 may detect a reduced performance of a communication between the network 108 and the mobile device 102. In some embodiments, the detecting module 410 may determine that the reduced performance is associated with network throttling imposed on an account of the user 104.

At 604, the surfacing module 412 may provide, in the user interface 116 at the mobile device 102, one or more upgrade options to the user 104 in response to a determination that the reduced performance is associated with network throttling imposed on an account of the user 104. For example, the one or more upgrade options may be associated with the usage of the network 108 by user 104. In some embodiments, the surfacing module 412 may present the content data 110 by executing the application 118 in the user interface 116 at the mobile device 102, and also surface a message indicating the one or more upgrade options in the user interface 116 at the mobile device 102.

In some embodiments, the one or more upgrade options may include an option to upgrade a service level of a service provided by the network operator 126 to the user 104. In some embodiments, the one or more upgrade options may include an option of purchase of an Internet access service by the service provider 114 to allow one or more mobile devices associated with the account to have access to the content data 110.

At 606, the communication module 414 may receive the selection of one of the one or more upgrade options made by user 104. For example, the communication module 414 may receive the selection that is input by the user 104 in the user interface 116 at the mobile device 102. In some embodiments, the communication module 414 may enable the user 104 to disable a function associated with surfacing the message associated with the one or more upgrade options. In these instances, the message indicating the one or more upgrade options may not be surfaced again unless the user 104 re-enable the surfacing function.

At 608, the communication module 414 may at least partially cause an adjustment of the network throttling imposed on the account of the user 104. For example, the communication module 414 may communicate with one or more components of the telecommunications management system 120 to modify a data transfer bandwidth between the access gateway device 126 and the mobile device 102.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed:

1. One or more non-transitory computer-readable media storing computer-executable instructions that, when executed on one or more processors, causes the one or more processors to perform acts comprising:
  causing, by a network management system of a wireless network operator, a user interface of a user device to present content data from a service provider via an application on the user device, wherein the content data is accessible by the user device via an internet access service provided by the wireless network operator;
  detecting a reduced performance associated with the internet access service and the user device;
  determining that the reduced performance is associated with network throttling imposed on a user account associated with the user device;
  causing, by the network management system, the user interface of the user device to present one or more upgrade options at the user device, the one or more upgrade options being based at least in part on the reduced performance;

receiving, by the network management system, information indicating a user selection of one of the one or more upgrade options;

adjusting, by the network management system, the network throttling imposed on the user account based at least in part on the user selection; and identifying the service provider that provides access to the content data being presented on the user device, the service provider being different from the wireless network operator.

2. The one or more non-transitory computer-readable media of claim 1, further comprising:

detecting that traffic shaping is impacting a performance of the internet access service, and wherein, determining that the reduced performance is associated with the network throttling is based at least in part on detecting the traffic shaping.

3. The one or more non-transitory computer-readable media of claim 1, further comprising:

detecting that traffic policing is impacting a performance of the internet access service, and wherein, determining that the reduced performance is associated with the network throttling is based at least in part on detecting the traffic policing.

4. The one or more non-transitory computer-readable media of claim 1, further comprising:

transmitting, to the service provider, a message indicating that network throttling is imposed on the user account, the message further indicating that a presentation of the content data on the user device is being impacted by the network throttling; and receiving, from the service provider, an upgrade option that comprises an option to purchase, from the service provider, an additional internet access service that provides internet access for the content data on the user device.

5. The one or more non-transitory computer-readable media of claim 1, wherein the one or more upgrade options are presented on the user interface contemporaneously while the content data is being presented on the user interface.

6. The one or more non-transitory computer-readable media of claim 1, wherein the one or more upgrade options include an option for the service provider to purchase an additional internet access service that allows the user device to access the content data provided by the service provider.

7. The one or more non-transitory computer-readable media of claim 1, wherein the content data comprises one of a video recording, an audio recording, a multimedia presentation, or an online content.

8. The one or more non-transitory computer-readable media of claim 1, wherein to adjust the network throttling imposed on the user account includes adjusting a data transfer bandwidth associated with the user device.

9. The one or more non-transitory computer-readable media of claim 1, wherein adjusting the network throttling comprises updating a configuration in an access gateway device associated with the network management system to modify a data transfer bandwidth associated with the user device.

10. The one or more non-transitory computer-readable media of claim 1, further comprising:

providing a software development kit (SDK) associated with the application on the user device to present the one or more upgrade options in the user interface at the user device, the SDK comprising a plurality of application programming interfaces (APIs) of a plurality of services associated with a telecommunications network service.

11. The one or more non-transitory computer-readable media of claim 1, further comprising:

causing the user interface to present a message to surface a contemporaneously while the content data is being presented via the application on the user device, the message being associated with the one or more upgrade options.

12. The one or more non-transitory computer-readable media of claim 1, further comprising:

receiving, by the network management system, a request for network throttling information associated with the user device, and wherein, determining that the reduced performance is associated with the network throttling imposed on the user account is based at least in part on receipt of the network throttling information.

13. A computer-implemented method, the method comprising:

under control of one or more processors:

detecting a reduced performance associated with a first internet service and a user device;

determining that the reduced performance is associated with network throttling imposed on a user account associated with the user device;

identifying a service provider that provides content data that is being presented on the user device, the service provider being different from a wireless network operator that provides the first internet service;

transmitting, to the service provider, a message indicating that network throttling is imposed on the user account, the message further indicating that a presentation of the content data on the user device is being impacted by the network throttling;

receiving, from the service provider, an upgrade option to purchase, from the service provider, a second internet access service that provides internet access for the content data on the user device;

causing, by a network management system, a user interface of the user device to present at least the upgrade option, based at least in part on the reduced performance; and adjusting, by the network management system, the network throttling imposed on the user account based at least in part on a user selection of the upgrade option.

14. The computer-implemented method of claim 13, further comprising:

detecting that one of traffic shaping or traffic policing is impacting a performance of the first internet service, and wherein, determining that the reduced performance is associated with the network throttling is based at least in part on detecting one of the traffic shaping or the traffic policing.

15. The computer-implemented method of claim 13, further comprising:

causing, by the network management system, an additional upgrade option for the service provider to purchase the second internet access service that allows the user device to access the content data, and wherein, the user selection corresponds to the additional upgrade option.

16. The computer-implemented method of claim 13, wherein the content data comprises one of a video recording, an audio recording, a multimedia presentation, or an online content.

17. The computer-implemented method of claim 13, wherein the upgrade option is presented on the user interface contemporaneously while the content data is being presented on the user interface, based at least in part on the network throttling information.

18. A network management system, comprising:
one or more processors;
memory coupled to the one or more processors, the memory including one or more modules that are executable by the one or more processors to:
detect whether performance of a first internet access service at a user device is impacted by network throttling imposed on a user account associated with the user device;
in response to detecting a reduced network performance, identify a service provider that provides content data that is presented at the user device, the service provider being different from a wireless network operator that provides the first internet access service;
receive, from the service provider, an upgrade option associated with a second internet access service that provides internet access for the content data on the user device; and
adjust the network throttling imposed on the user account based at least in part on a user selection of the upgrade option.

19. The system of claim 18, wherein the one or more modules are further executable by the one or more processors to:
detect whether traffic shaping or traffic policing is impacting a performance of the first internet access service, and
wherein to determine whether a reduction in the performance of the first internet access service is associated with the network throttling is based at least in part on detecting the traffic shaping or the traffic policing.

20. The system of claim 18, wherein the one or more modules are further executable by the one or more processors to:
receive a request for network throttling information associated with a user device, and wherein to determine that a reduction in the performance of the first internet access service is associated with the network throttling imposed on the user account is based at least in part on receipt of the network throttling information.

* * * * *